M. D. JUDKINS.
GANG-PLOW.

No. 188,247. Patented March 13, 1877.

Witnesses:
P. C. Dieterich
F. H. Duffy

Inventor:
Mark D. Judkins
Per: C. H. Watson & Co.
Attorneys.

UNITED STATES PATENT OFFICE.

MARK D. JUDKINS, OF OSAKIS, MINNESOTA.

IMPROVEMENT IN GANG-PLOWS.

Specification forming part of Letters Patent No. 188,247, dated March 13, 1877; application filed June 6, 1876.

*To all whom it may concern:*

Be it known that I, MARK D. JUDKINS, of Osakis, in the county of Douglas and State of Minnesota, have invented certain new and useful Improvements in Gang-Plows; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a gang-plow, as will be hereinafter more fully set forth.

Figure 1:
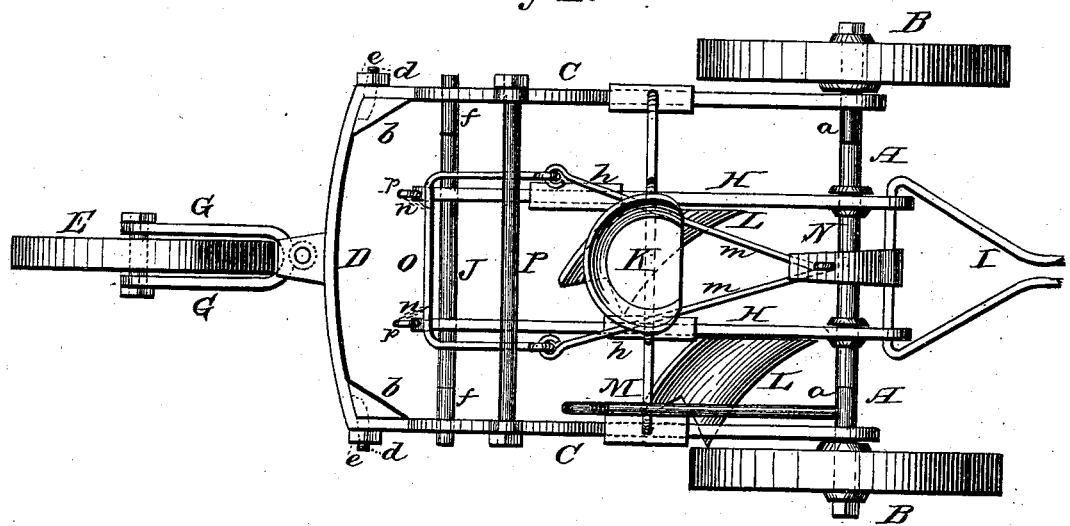
Figure 2:
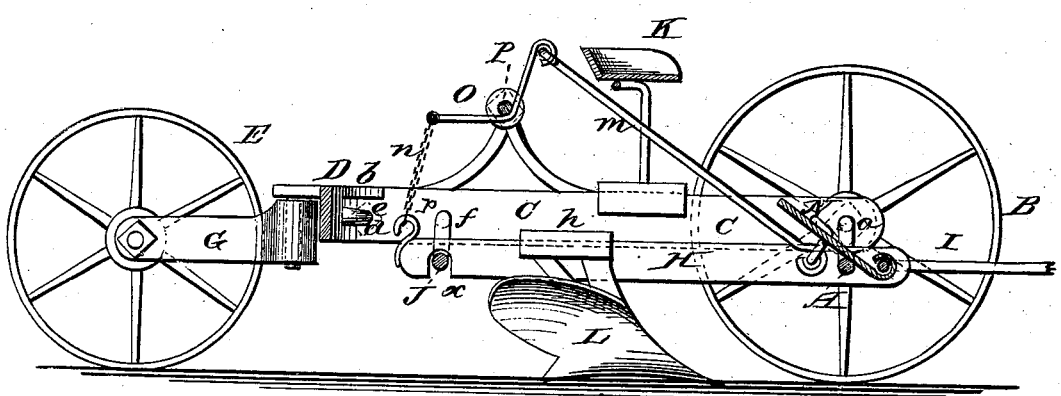
Figure 3:
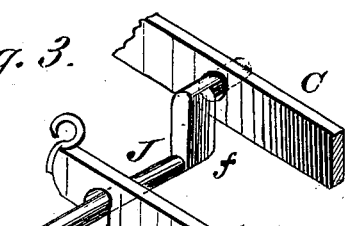

In the annexed drawing, Figure 1 is a plan view of my invention. Fig. 2 is a longitudinal section of the same; and Fig. 3 is a detached view of a part thereof.

A represents the axle, provided at each end with a crank, $a$, upon which the wheel B is placed. The frame of my gang-plow is composed of two parallel side pieces, C C, the front ends of which are placed on the cranks $a$ $a$ of the axle, immediately inside of the wheels B B. The rear ends of the side pieces C C are connected by a cross-bar, D, at each end of which, on the inner or front side, is a bolt, $d$, passing through the side bar C, and a nut, $e$, screwed on the end thereof, to unite the parts. Corner-pieces $b$ are secured to each side bar C, to form suitable braces, as shown.

The rear end of the frame is supported by a single wheel, E, or two wheels, mounted between two arms, G, which are connected at their front ends, and swiveled to the center of the bar D.

On the axle A are pivoted two plow-beams or more, H H, to the front ends of which the draft-rod I is attached, so as to bring the draft directly upon the beams at all times. The beams H extend rearward from the axle, and have each a notch, X, cut in the lower edge near the rear end, said notches fitting over a rod, J, formed with cranks $ff$ at its ends, and suspended by said cranks in the side bars C C. K is the driver's seat, supported by suitable arms from the side bars C. L L represent the plows, the standards of which have at their upper ends angular flanges $h$ $h$ to fit over the upper edges of the beams H, and thus suspend the plows from said beams.

To one of the cranks $a$ of the axle is secured a lever or handle, M, by means of which the axle is turned up or down as required, and as the plow-beams fit over the crank-rod J, said rod is also turned to correspond, and thus both ends of the beams are raised or lowered simultaneously, for regulating the depth at which the plows are to work.

A suitable rack-bar or other similar device is to be attached to the frame for holding the lever M at any point desired, and thereby hold the plows at the required height.

N is a foot-lever, connected by two rods, $m$ $m$, with the ends of a bail, O, which is secured to a rocking shaft, P, having its bearings in suitable standards on the side bars C C. The bail O is, by chains $n$ $n$, connected with hooks $p$ $p$ on the rear ends of the beams H H, so that by operating the foot-lever both plows may be raised out of the ground.

Any number of beams and plows may be arranged in the same manner, as above described, for two. If either plow meets with an obstruction it will rise over the same independently of the other plow or plows.

By the construction of the machine as described, it will be seen that if any part should be broken, such broken part can easily be detached and another one substituted in place thereof.

Having thus fully described my invention, what I claim as new, and desire to secure by Letters Patent, is—

1. In a gang-plow, of two plows or more, the combination of the crank-axle A, side bars C C, having corner-pieces $b$ $b$, the rear cross-bar D, with bolts $d$ $d$ and nuts $e$ $e$, and the swiveled frame G, with wheel E, all substantially as and for the purposes herein set forth.

2. The combination of the crank-axle A with lever M, the plow-beams H having notches X near their rear ends, and the crank-rod J, substantially as and for the purposes herein set forth.

MARK D. JUDKINS.

Witnesses:
LUCAS KELLS,
N. H. MINER.